United States Patent [19]

Yoshida et al.

[11] 4,258,401

[45] Mar. 24, 1981

[54] MULTI-CHANNEL RECORD/PLAYBACK MAGNETIC HEAD

[75] Inventors: Masahide Yoshida; Takashi Kodama, both of Hachioji, Japan

[73] Assignee: Olympus Optical Co., Ltd., Tokyo, Japan

[21] Appl. No.: 34,564

[22] Filed: Apr. 30, 1979

[30] Foreign Application Priority Data

May 29, 1978 [JP] Japan .................. 53-64015

[51] Int. Cl.³ ............................... G11B 5/12
[52] U.S. Cl. .................. 360/125; 360/121; 360/122
[58] Field of Search ............ 360/125, 121–123, 360/119, 117, 2

[56] References Cited

U.S. PATENT DOCUMENTS 2,536,030  1/1951  Camras .................. 360/110

FOREIGN PATENT DOCUMENTS 526005  11/1976  U.S.S.R. .................. 360/121

OTHER PUBLICATIONS

IBM/TDB, "Edge Effect Magnetic Recording", by Dawson et al., vol. 9, No. 7, Dec. 1966, pp. 776–777.
IBM/TDB, "Interleaved Multielement Magnetic Head", by Kingston, vol. 15, No. 6, Nov. 1972, p. 2035.

Primary Examiner—John H. Wolff
Attorney, Agent, or Firm—Weinstein & Sutton

[57] ABSTRACT

A multi-channel record/playback head is disposed which is used with a magnetic recording medium of vertical magnetization type. The head comprises a plurality of magnetic head elements each including a magnetic record/playback pole disposed opposite to the surface of the medium and a flux conducting pole disposed opposite to a lateral end face of the medium. The elements are arranged so that the individual record/playback poles define different tracks across the width of the medium.

7 Claims, 6 Drawing Figures

MULTI-CHANNEL RECORD/PLAYBACK MAGNETIC HEAD

BACKGROUND OF THE INVENTION

The invention relates to a multi-channel record/playback magnetic head, and more particularly, to such a head which may be used in a magnetic recorder of the vertical magnetization type in which a high density recording is achieved by establishing a remanence in the direction of thickness of a magnetic recording medium such as magnetic tape.

Ordinarily, the technique to record an information signal on a magnetic recording medium such as magnetic tape comprises bringing a magnetic head into abutment against the surface of the medium to establish a remanence in a direction parallel to the surface of the medium. As is well known, when this technique is used, the head has its poles located opposite to each other with a narrow air gap therebetween so that a leakage flux from the gap is bypassed through the medium. Because the leakage flux passes through the medium in a direction parallel to its surface, the magnetizable material contained in the medium is magnetized in a direction parallel to the surface of the medium, with its remanence defining a magnetic record. With the described magnetic recording technique, it is known that considerations of the air gap of the magnetic head and the frequency of signals being recorded impose a limitation on the recording density of information signal.

Recently, a variety of recording techniques have been proposed which drastically improves the recording density by a so-called vertical magnetization scheme in which a remanence is established in the medium in a direction perpendicular to the surface thereof or in the direction of its thickness. This technique employs a magnetic recording medium having an easy axis of magnetization in a direction perpendicular to the surface. Referring to FIG. 1, there is shown a magnetic recording medium 6 comprising a base film 6c of polyester, for example, carrying an upper layer 6b of high permeability material and a top layer 6a coated thereon which is formed of a magnetizable material having an easy axis of magnetization in a direction perpendicular to the surface.

FIG. 1 also shows a magnetic head 1 which may be used for recording a signal in such medium. Head 1 shown is adapted to record a signal on or reproduce a signal from one track. It comprises a magnetic head core 2 of a magnetizable material such as ferrite which has an inverted U-configuration and a coil 3 disposed thereon. The core 2 has a pair of limbs 4, 5, the free end of which define magnetic poles 4a, 5a which may be brought close to or in abutment against the magnetic recording medium 6 for purpose of recording and/or playback. In use, when a signal current is passed through coil 3 while disposing the poles 4a, 5a of the head 1 close to or in abutment against the top layer 6a of the recording medium 6 and moving the medium in a direction perpendicular to the plane of the drawing, a recording flux 7 is produced within the core 7. The flux leaving the pole 4a passes through the top layer 6a perpendicularly and then passes through the high permeability layer 6b horizontally or in a direction parallel to the surface and then returns to the pole 5a, thus forming a closed magnetic path. Since the flux passes through portions of the top layer 6a which are located opposite to the poles 4a, 5a in a direction perpendicular thereto, these portions are magnetized in a vertical direction. It will be noted that these portions are magnetized in mutually opposite directions, and the pair of magnetized portions define a desired record of the signal.

During the playback operation, as the medium 6 runs in a direction perpendicular to the plane of the drawing, the remanence formed therein produces a flux which follows a closed magnetic path including the high permeability layer 6b and the core 2 which is disposed close to or in abutting relationship therewith. The flux links with the coil 3 to produce a playback current therein which varies with time in a manner corresponding to a change with time in the remanence recorded in the top layer 6a as the medium 6 moves.

It will be evident from FIG. 1, that one track is defined by those regions of the medium 6 which are scanned by the pair of poles 4a, 5a and an intermediate region located therebetween, and that a doubled signal recording occurs because the same signal is located in those portions of medium 6 located immediately adjacent to the both poles 4a, 5a. Thus, this recording technique is wasteful in that non-used region remains, and this stands in the way to achieving a high density recording. Another disadvantage of the head 1 shown is the difficulty to maintain an accurate tracking of the poles 4a, 5a with respect to a record track, presenting a liability that undesirable signals other than the intended signal may be picked up as noises.

As mentioned previously, the track width is defined by the pair of poles 4a, 5a, and cannot be reduced inasmuch as reduction of the pole areas as well as the distance therebetween is limited by considerations of the properties of a magnetizable material. Hence it will be very difficult, if not impossible, to construct a multi-channel record/playback head of vertical magnetization type in a small construction utilizing the arrangement as illustrated in FIG. 1. Specifically, the core cannot be minimized in size for the reason mentioned above. Additionally, if a plurality of magnetic head elements, each comprising such core and a coil disposed thereon, are disposed adjacent to each other in alignment with a crosswise dimension of the recording medium, the spacing between adjacent elements must be increased in order to prevent a crosstalk between them, resulting in a degraded efficiency of utilizing the medium and an increased size of the overall head assembly. These structural disadvantages will be remarkably manifest to prohibit a practical use with an increased number of such head elements which may be required in a head assembly which is used to process a digital signal for entry and retrieval of data with a computer or which may be used in a multi-channel tape recorder of automatic reverse type.

The present applicant has previously proposed an improved construction shown in FIG. 2 and disclosed in copending U.S. application Ser. No. 020,922, filed Mar. 15, 1979, assigned to a common assignee in order to eliminate the described disadvantages of the conventional head 1. Magnetic head 11 shown in FIG. 2 comprises a magnetic head core 12 formed of a magnetizable material such as ferrite, and a coil 13 disposed thereon. The core 12 includes a magnetic record/playback limb 14 and a flux conducting, magnetic limb 15 of an inverted L-configuration which is connected with the limb 14 by a horizontal arm. It will be noted that the free end of the limb 14 is disposed opposite to the surface of the recording medium 6 to define a magnetic pole 14a which is used to record a signal on the medium or to read information therefrom. On the other hand, the free end of the limb 15 is disposed in opposing relationship with one lateral end face 6d of the medium 6 and defines a pole 15a which is adapted to conduct a flux that has passed through the high permeability layer 6b.

When the head 11 is disposed as shown so that the pole 14a is located close to or in abutment against the top layer 6a of the medium 6 and the latter run in a direction perpendicular to the plane of the drawing while passing a signal current through coil 13, a recording flux 17 is produced within the core 12, which follows a closed magnetic path including the high permeability layer 6b. The flux passes through a portion of the top layer 6a which is located opposite to the pole 14a in a perpendicular direction, thus magnetizing it in the direction of its thickness. After passing through the high permeability layer 6b, the flux returns to the core 12 from the lateral end face 6d of the medium 6, thus virtually leaving no influence upon the medium 6 other than recording the signal. It will be readily apparent that the recorded signal can be reproduced in the same manner as mentioned above in connection with FIG. 1.

When the head 11 is used, one signal track is defined by a region of the medium 6 which is scanned by the single pole 14a. Since the width of the pole 14a defines the signal track, it is unnecessary to reduce the overall size of the head core 12 as required in the arrangement of FIG. 1 in order to reduce the track width. Additionally, there occurs no wasteful signal recording on the medium 6. By reducing the width of the pole 14a, the signal track may be reduced to any desired width. Thus it will be understood that a simple construction for a multi-channel record/playback head of vertical magnetization type can be obtained by utilizing the construction of head 11.

SUMMARY OF THE INVENTION

It is an object of the invention to provide a multi-channel record/playback head which is used with a magnetic recording medium of the vertical magnetization type and which includes a plurality of head elements each including a record/playback magnetic limb disposed in opposing relationship with the surface of the medium and a flux conducting, magnetic limb disposed in opposing relationship with a lateral end face of the medium, the elements being received within a head housing and located therein so that individual record/playback limbs define different signal tracks of the medium.

The invention permits a plurality of record tracks to be formed without a wasteful recording on the medium, and thus contributes to a full achievement of a high density recording which characterizes the vertical magnetization recording scheme. The width of the record tracks can be reduced by reducing the width of individual record/playback limbs, thus facilitating the manufacture of a multi-channel record/playback head without the need to increase the overall size. Cross-talk between adjacent elements is easily prevented since the elements are not aligned crosswise of the medium. The flux conducting limb which is disposed in opposing relationship with a lateral end face of the medium also serves as a guide member for the running medium, thus effectively minimizing tracking error and hence the occurrence of noises.

In a modification, the plurality of head elements may be disposed in a symmetrical manner by reversing their orientation through 180°. This permits the use of cores having an identical configuration, greatly simplifying the core manufacturing steps and facilitating their assembly, resulting in a reduced manufacturing cost.

DESCRIPTION OF PREFERRED EMBODIMENTS

Figure 3:
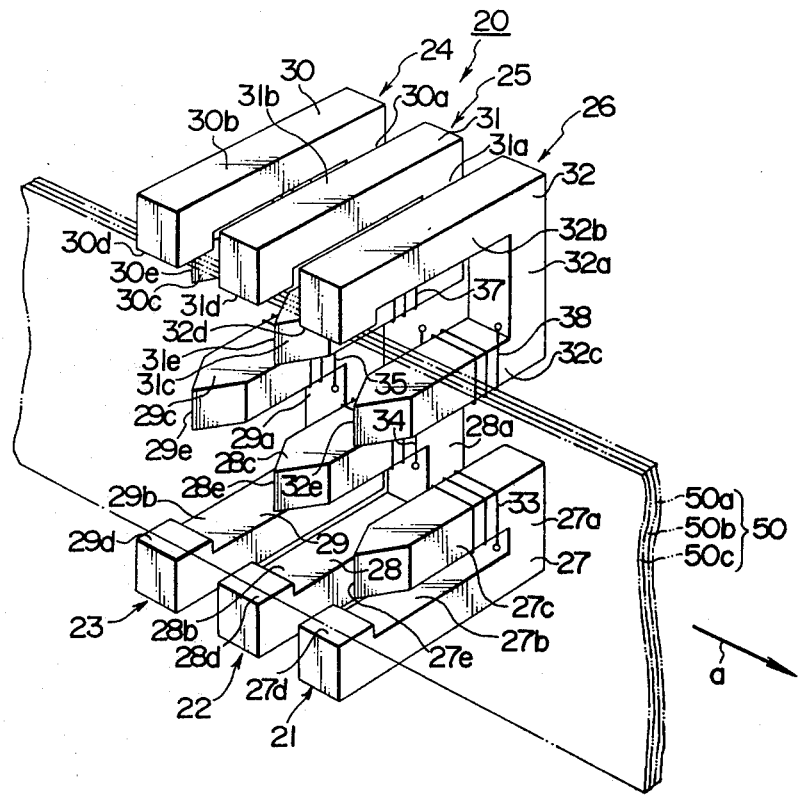
FIG. 3 is an exploded, perspective view of a multi-channel record/playback head according to one embodiment of the invention.
Figure 4:
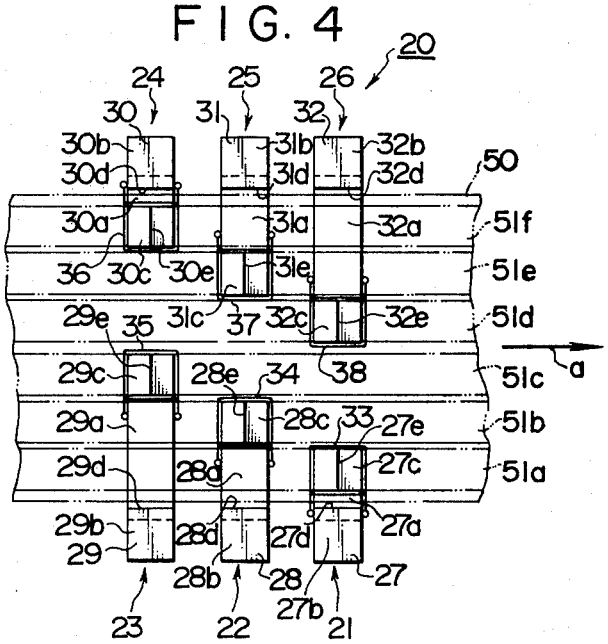
FIG. 4 is a front view of the head shown in FIG. 3.

Referring to FIGS. 3 and 4, there is shown a multi-channel record/playback magnetic head 20 according to the invention. It comprises six magnetic head elements 21 to 26. Specifically, three elements 21 to 23 are disposed from right to left along the lower half of a magnetic tape 50, representing a magnetic recording medium, which is adapted to run in the direction of an arrow a. Three other elements 24 to 26 are disposed from left to right along the upper half of the tape 50. Each of the elements 21–26 comprises a magnetic head core 27–32 and a coil 33–38 disposed thereon.

The cores 27–29 associated with the elements 21–23 which are disposed along the lower half of the tape 50 each comprise a vertical arm 27a–29a having a progressively increasing height as the core is transposed from right to left, a flux conducting, magnetic limb 27b–29b which extends horizontally forward from the lower end of the associated vertical arm 27a–29a, and a magnetic record/playback limb 27c–29c which extends horizontally forward from the upper end of the vertical arm. The free end of the flux conducting limb 27b–29b is formed with a short extension which extends upward from the upper edge thereof and which defines a flux conducting pole 27d–29d adapted to be located opposite to the lower end face of the tape 50. The free end of the record/playback limb 27c–29c is longitudinally tapered into a rectangular end face representing a record/playback pole 27e–29e which is elongate in the direction of width of the tape and which is adapted to be disposed opposite to the tape surface. It will be appreciated that the record/playback poles 27e–29e, each of which represents a sharp edge of the elements 21–23, are disposed close to or in abutment against the tape surface in a stepped manner. As the tape 50 runs under this condition, a first to a third track 51a to 51c (see FIG. 4) are defined in the lower half of the tape 50, by means of the poles 27e–29e.

The elements 24–26 which are disposed along the upper half of the tape 50 include head cores 30–32, each of which is formed to be in conformity to and of a same size as a selected one of the cores 27–29 disposed along the lower half of the tape. Specifically, core 30 has the same size and configuration as the core 27, as do the cores 31 and 32 with the cores 28 and 29, respectively. However, it will be noted that the upper cores are reversed 180° with respect to the lower core. It will be seen that the cores 30–32 include a vertical arm 30a–32a which has a progressively increasing height as the core is transposed from left to right, a flux conducting, magnetic limb 30b–32b which extends horizontally forward from the upper end of the vertical arm, and a magnetic record/playback limb 30c–32c which extends horizontally forward from the lower end of the vertical arm. The free end of the flux conducting limb 30b–32b is provided with a short extension which extends downwardly from the lower edge thereof to define a flux conducting pole 30d–32d while the free end of the record/playback limb 30c–32c is longitudinally tapered into a sharp edge defining a record/playback pole 30e–32e which is elongate in the direction of width of the tape.

The flux conducting poles 30d–32d of the elements 24–26 are disposed close to or in abutment against the upper end face of the tape 50 while the record/playback poles 30e–32e are disposed close to or in abutment against the major tape surface. As the tape 50 runs under this condition, a fourth to a sixth track 51d–51f (see FIG. 4) are formed in the upper half of the tape 50 by means of the poles 30e–32e.

The elements 21, 22 and 23 disposed along the lower half of the tape 50 are vertically aligned with the elements 26, 25 and 24, respectively, which are disposed along the upper half of the tape 50. It is to be noted that the cores 27–29 are disposed 180° inverted from or symmetrically to cores 30–32 with respect to a point which represents the intersection of the longitudinal centerline of the tape 50 and a vertical line which joins the pair of vertically aligned elements 22, 25. It is to be understood that the elements 21–26 are contained in a head housing, not shown, with a magnetic shielding plate, not shown, interposed between them.

Figure 1:
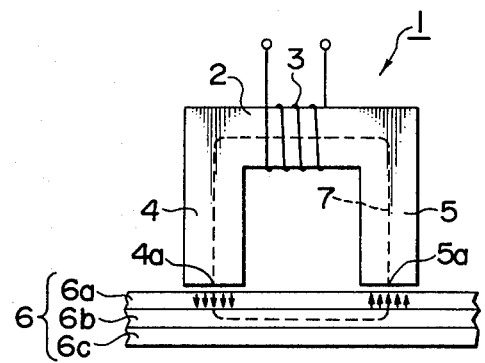
FIG. 1 is a plan view of a conventional magnetic head of the vertical magnetization type.
Figure 2:
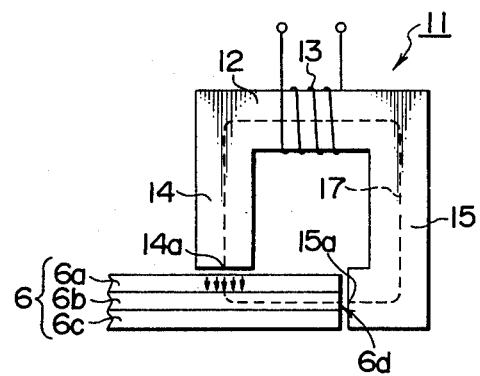
FIG. 2 is a plan view of a single track head of the type shown in FIG. 1, but which is improved over the latter.

The tape 50 is constructed in the same manner as the medium 6 shown and described avove in connection with FIGS. 1 and 2. Specifically, it comprises a base film 50c carrying a high permeability layer 50b thereon and a top layer 50c deposited thereon which has an easy axis of magnetization in the direction of the thickness of the tape 50.

In use, the elements 21–26 are disposed such that their record/playback poles 27e–32e are disposed opposite to the top layer 50a of the tape 50 while the flux conducting poles 27d–29d and 30d–32d disposed opposite to the lower and upper end faces, respectively, of the tape. The tape 50 is then driven for movement in the direction indicated by an arrow a as shown in FIGS. 3 and 4. By passing signal currents through the individual coils 33–38, corresponding fluxes are produced in the individual cores which follow six closed magnetic paths each including the top layer 50a and the high permeability layer 50b of the tape 50. In this manner, portions of the top layer 50a which are located opposite to the poles 27e–32e are magnetized in he vertical orientation to the surface, achieving a signal recording across six tracks simultaneously. The playback operation of the multiple head elements occurs in the same manner as that described with the single track head shown in FIGS. 1 and 2.

In the above embodiment, the head 20 is used so that a recording or playback operation occurs simultaneously with respect to six tracks 51a–51f of the tape 50. However, the head 20 may be used in a number of optionally selected manners. For example, one-half of the elements 21–26 may be used as record elements while the remainder as playback elements, thus simultaneously achieving a recording and a playback operation as the tape 50 runs. Alternatively, the upper elements 24–26 may be operated during a forward movement of the tape while the remaining elements 21–23 may be operated during a reverse movement thereof, thus achieving a continued record or playback operation during forward and reverse movement of the tape. It should be understood that the number of elements may be changed as desired.

Figure 5:
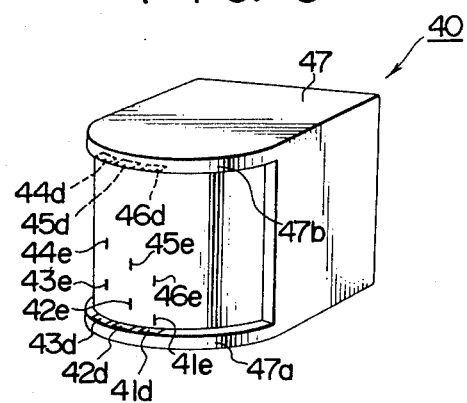
FIG. 5 is a perspective view of a multi-channel record/playback head according to another embodiment of the invention.

FIG. 5 shows a multi-channel record/playback head 40 according to another embodiment of the invention. As compared with the magnetic head 20 shown in FIGS. 3 and 4, the length of the individual record/playback poles of the head 40 is reduced to one-half that of the head 20. The length of the vertical arms 27a–29a of the lower elements 21–23 is reduced, while the length of the vertical arms 30a–32a of the upper elements 24–26 is increased to shift the record/playback poles associated with the upper elements toward those of the lower elements 21–23, thus enabling six tracks to be formed in the lower half of the tape 50.

Individual record/playback poles 41e–46e of the head 40 are exposed through a curved head surface of a head housing 47 in the region of its lower half while flux conducting poles 41d–43d and 44d–46d are exposed through a pair of lower and upper tape guides 47a, 47b which project forwardly from the opposite end faces of the head surface. The head 40 may be used in the same manner as the head 20, forming six tracks in one-half the width of the tape. Thus, by reversing the direction of tape running, a total of twelve tracks can be formed across the tape width, each six tracks in the upper and lower halves of the tape.

Figure 6:
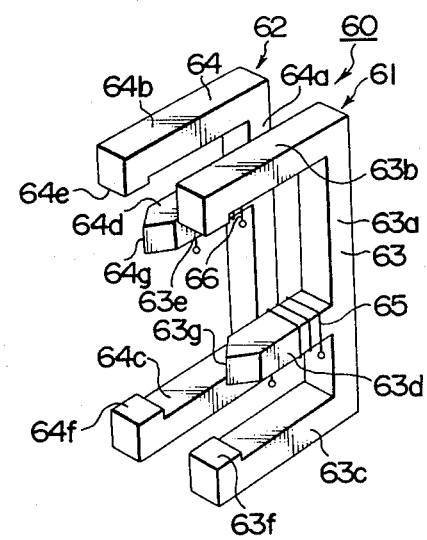
FIG. 6 is an exploded, perspective view of a multi-channel record/playback head according to a further embodiment of the invention.

FIG. 6 shows a multi-channel record/playback head 60 according to a further embodiment of the invention. In this instance, one head element comprises a record/playback, magnetic pole and a pair of flux conducting poles. Two such elements are contained in a head housing so as to form two tracks on the tape. Specifically, a pair of magnetic head elements 61, 62 each comprise a magnetic head core 63, 64 having E-configuration, and a coil 65, 66 thereon. Each of the cores 63, 64 includes a vertical arm 63a, 64a, a pair of flux conducting limbs 63b, 64b and 63c, 64c which extend horizontally forward from the upper and lower ends of the respective arms 63a, 64a, and a magnetic record/playback limb 63d, 64d which extends horizontally forward from an intermediate position on the vertical arm. The free end of the upper flux conducting limbs 63b, 64b is formed with a short extension which extends downwardly to define an upper, flux conducting pole 63e, 64e which is adapted to be disposed opposite to the upper lateral end face of the tape while the free end of the lower limbs 63c, 64c is similarly formed with a short extension which extend upwardly to define a lower, flux conducting pole 63f, 64f which is adapted to be disposed opposite to the lower lateral end face of the tape. Flux conducting poles 63a, 64a and 63f, 64f are thus vertically spaced in opposing relationship, and are disposed close to or in abutment against the opposite lateral end faces of the tape 50 to assure the formation of good closed magnetic paths. In addition, they serve as guide members for tape running.

It will be noted that the record/playback limbs 63d, 64d are at different elevations and their free end is longitudinally tapered into a sharp edge having a rectangular end face which defines a magnetic record/playback pole 63g, 64g which is elongate in the direction of width of the tape. Poles 63g, 64g are effective to form two tracks in the upper and lower regions of the tape 50. The coils 65, 66 are disposed on these record/playback limbs 63d, 64d.

The cores 63, 64 may be formed in an identical configuration, with one of them being reversed 180° when they are used in juxtaposition. This simplifies the manufacturing process as well as their assembly, providing an inexpensive head 60.

It should be apparent that the head 60 may be used in the same manner as the head 20, effecting a record or playback operation with tape 50.

It is to be understood that while the head 60 shown in FIG. 6 is adapted to define two tracks, the number of magnetic head elements may be increased to provide a multi-channel record/playback head capable of forming more than two tracks.

What is claimed is:

1. A multi-channel record/playback magnetic head for use with a magnetic tape recording medium including a high permeability layer carrying a film base on one side thereof and carrying a top layer on the opposite side thereof which has an easy axis of magnetization in the direction of thickness thereof; the head comprising a plurality of magnetic head elements, each of the elements including a magnetic head core, each core including a magnetic record/playback pole which is adapted to be disposed opposite to the surface of the top layer and at least one flux conducting pole separate from said record/playback pole adapted to be disposed opposite to at least one lateral end face of the recording medium, the plurality of magnetic head elements being adapted to be arranged with their individual record/playback poles located opposite to areas of the recording medium which are mutually different crosswise thereof so that said record/playback poles are staggered relative to each other and relative to said recording medium.

2. A multi-channel record/playback head according to claim 1 in which the record/playback pole is tapered to form an elongate end face which is adapted to be disposed opposite to the recording medium.

3. A multi-channel record/playback head according to claim 1 in which the flux conducting pole serves as a guide member for the running of the recording medium.

4. A multi-channel record/playback head according to claim 1 in which the plurality of magnetic head elements have mutually different vertical elevations, a first plurality of said magnetic head elements which represents one-half of the total number thereof having said flux conducting poles adapted to be disposed in abutment against one lateral end face of the recording medium, a second plurality of said magnetic head elements representing the remaining half having said flux conducting poles adapted to be disposed in abutment against the other lateral end face of the recording medium.

5. A multi-channel record/playback head according to claim 4 in which the first and the second plurality of magnetic head elements are disposed in a point symmetry so that if they were rotated through 180° about the point of symmetry, they would be interchangeably positioned.

6. A multi-channel record/playback head according to claim 1 in which the core has an E-configuration including a pair of upper and lower horizontal limbs each having a free end comprising a pair of said flux conducting poles which are adapted to engage the both lateral end faces of the recording medium, said core also including an intermediate horizontal limb having its free end being tapered to defined said magnetic record/playback pole.

7. A multi-channel record/playback head according to claim 6 in which the intermediate horizontal limb of different cores have different vertical elevations.

* * * * *

UNITED STATES PATENT AND TRADEMARK OFFICE
CERTIFICATE OF CORRECTION

PATENT NO. : 4,258,401
DATED : March 24, 1981
INVENTOR(S) : Yoshida et al.

It is certified that error appears in the above—identified patent and that said Letters Patent is hereby corrected as shown below:

Column 5, line 59, change "he" to -- the --.

Claim 2, line 3, delete " adapted to be".

Signed and Sealed this

Fifteenth Day of September 1981

[SEAL]

Attest:

GERALD J. MOSSINGHOFF

Attesting Officer

Commissioner of Patents and Trademarks